United States Patent
Baum et al.

(10) Patent No.: US 6,963,466 B2
(45) Date of Patent: Nov. 8, 2005

(54) RADIAL DEPENDENT LOW FREQUENCY REPEATABLE RUN OUT COMPENSATION APPARATUS AND METHOD

(75) Inventors: Michael Edward Baum, Longmont, CO (US); Brent Jay Harmer, Johnstown, CO (US); Steven Alan Koldewyn, Berthoud, CO (US)

(73) Assignee: Seagate Technology LLC, Scotts Valley, CA (US)

(*) Notice: Subject to any disclaimer, the term of this patent is extended or adjusted under 35 U.S.C. 154(b) by 51 days.

(21) Appl. No.: 10/603,885

(22) Filed: Jun. 25, 2003

(65) Prior Publication Data
US 2004/0264032 A1 Dec. 30, 2004

(51) Int. Cl.[7] .............................................. G11B 5/596
(52) U.S. Cl. ................................ 360/77.04; 360/78.04
(58) Field of Search ................................. 360/75, 77.04, 360/77.02, 78.04

(56) References Cited

U.S. PATENT DOCUMENTS

| | | |
|---|---|---|
| 5,541,784 A | 7/1996 | Cribbs et al. |
| 5,550,685 A | 8/1996 | Drouin |
| 5,844,742 A | 12/1998 | Yarmchuk et al. |
| 5,949,605 A | 9/1999 | Lee et al. |
| 6,172,838 B1 * | 1/2001 | Ohba ..................... 360/77.04 |
| 6,178,157 B1 | 1/2001 | Berg et al. |
| 6,236,634 B1 | 5/2001 | Lee et al. |
| 6,239,940 B1 | 5/2001 | Sasamoto et al. |
| 6,392,834 B1 * | 5/2002 | Ellis ..................... 360/77.04 |
| 6,411,459 B1 | 6/2002 | Belser et al. |
| 6,476,995 B1 | 11/2002 | Liu et al. |
| 6,490,120 B1 | 12/2002 | Burton et al. |
| 6,493,175 B1 | 12/2002 | Carlson |
| 6,510,016 B1 | 1/2003 | Hattori |

* cited by examiner

Primary Examiner—Andrew L. Sniezek
(74) Attorney, Agent, or Firm—David K. Lucente; Derek J. Berger (57) ABSTRACT

An apparatus and method for tracking radially-dependent repeatable run-out in a disc drive having a servo loop for positioning a head over a rotating disc is provided. The disc includes multiple tracks. Radially-dependent repeatable run-out control components for at least a subset of the multiple tracks are first determined. The subset of the multiple tracks being boundary tracks of established zones of a disc. Data representative of the radially-dependent repeatable run-out control components for the subset of the multiple tracks is then stored in a table. The stored data representative of the radially-dependent repeatable run-out control components is utilized to interpolate or extrapolate the radially-dependent repeatable run-out control components for tracks within a zone or outside of the zones for which data is known.

26 Claims, 7 Drawing Sheets

FIG. 7

RADIAL DEPENDENT LOW FREQUENCY REPEATABLE RUN OUT COMPENSATION APPARATUS AND METHOD

FIELD OF THE INVENTION

The present invention relates generally to servo systems in disc drives. In particular, the present invention relates to compensation for errors in servo systems.

BACKGROUND OF THE INVENTION

Disc drives read and write information along concentric tracks formed on discs. To locate a particular track on a disc, disc drives typically use embedded servo fields on the disc. These embedded fields are utilized by a servo sub-system to position a head over a particular track. In current disc drives, the servo fields are written onto the disc in-situ (i.e., after the disc is mounted on the spindle motor of a disc drive) when the disc drive is manufactured and are thereafter simply read by the disc drive to determine position.

Ideally, a head following the center of a track moves along a perfectly circular path around the disc. However, various types of errors prevent heads from following this ideal path. One type of error is a written-in error that arises during creation of the servo fields. Written-in errors occur because the write head used to produce the servo fields does not always follow a perfectly circular path due to unpredictable pressure effects on the write head from the aerodynamics of its flight over the disc, and from vibrations in the gimbal used to support the head. Because of these written-in errors, a head that perfectly tracks the path followed by the servo write head will not follow a circular path. Written-in errors are often referred to as repeatable run-out (RRO) errors or written-in repeatable run-out (WI-RRO) errors because they cause the same errors each time the head passes along a track. In drives employing in-situ-written discs, the RRO or WI-RRO phenomenon is typically not radially-dependent, i.e., there is no definite correlation between the radial position of a track between the disc inner diameter (ID) and the disc outer diameter (OD) on the disc surface and the WI-RRO associated with the track.

To meet the demand for greater recording density in disc drives, servo-track writing is undergoing a fundamental change. In the near future, manufactured disc drives will include discs with servo-tracks that are pre-written onto the discs before the discs are mounted on the spindle motor of the drive. Tests have shown that when such discs with pre-written tracks (pre-written discs) are mounted and clamped on a spindle motor of a disc drive, in addition to WI-RRO errors, RRO errors also occur due to centering misalignment of the pre-written servo tracks and the center of rotation of the spindle, and further due to track distortion caused by disc clamping forces. This additional RRO induced in drives including pre-written discs has been found to be radially-dependent, i.e., this additional RRO varies coherently across the surface of the disc from the OD to the inner ID.

Current servo tracking systems, which are utilized with in-situ-written discs described above, are designed for tracking WI-RRO and are not suitable for tracking radially-dependent repeatable run-out (RD-RRO). Thus, when such servo systems are employed for head position control in drives with pre-written discs, the settle time required for the head before it can properly follow a destination or target track at the end of a seek operation is relatively large. This large settle time, which is due to the slow adaptation of the servo system to the RD-RRO, negatively impacts the performance of the disc drive.

Embodiments of the present invention provide solutions to these and other problems, and offer other advantages over the prior art.

SUMMARY OF THE INVENTION

An apparatus and method for tracking radially-dependent repeatable run-out in a disc drive having a servo loop for positioning a head over a rotating disc is provided. With the apparatus and method, during disc drive calibration testing, a calibration is executed to measure and record the low frequency RRO at several zones across the radius of the disk for each head/disc surface pair that exists in the disc drive. The calibrated values are found, for example, by using the run-out compensation method proposed by Sacks et al., "Advanced Methods for Repeatable Runout Compensation," IEEE Transactions on Magnetics, vol. 31, no. 2, March 1995. These calibrated values are stored as a table in the disc drive's non-volatile memory (system data track) for retrieval at power on initialization.

In preparation for seeking, the destination's calibrated zone boundaries (table entries which were recorded at tracks before and after the destination track) are accessed. The values in these entries are used to interpolate the RRO compensation weights required for the destination track. If the destination track is beyond the last zone boundary, the last two zones are used to extrapolate to the destination track. These calculated RRO compensation weights are added to the actively adapting RRO compensation weights (stored in separate memory tables for each head) to create the full weight required to follow the low frequency RRO at the destination track.

These and various other features as well as advantages which characterize the present invention will be apparent upon reading of the following detailed description and review of the associated drawings.

BRIEF DESCRIPTION OF THE DRAWINGS

FIG. 1-1 is an exemplary diagram of a disc drive in accordance with the present invention.

FIG. 1-2 is an exemplary block diagram of a printed circuit board and its electrical couplings in accordance with the present invention.

FIG. 3-1 is a block diagram of a servo loop.

FIG. 3-2 is an RRO spectrum measured for a drive with in-situ-written discs and employing a RRO tracking scheme.

FIG. 3-3 is an RRO spectrum measured for a drive with pre-written discs and employing a RRO tracking scheme.

FIGS. 5-1 through 5-4 are plots representing RRO component values for different tracks.

DETAILED DESCRIPTION OF ILLUSTRATIVE EMBODIMENTS

Figure 11:
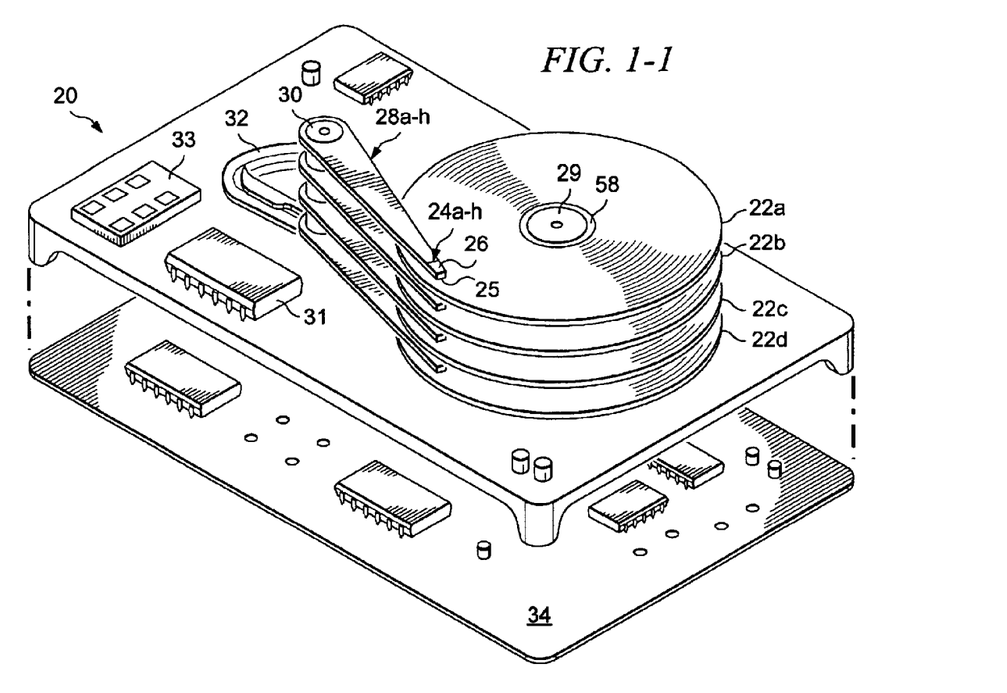

Referring now to the drawings, and initially to FIG. 1-1, there is illustrated an example of a disk drive designated generally by reference numeral 20. Disk drive 20 includes a stack of storage disks 22a–d and a stack of read/write heads 24a–h. Each of storage disks 22a–d is provided with a plurality of data tracks to store user data. As illustrated in FIG. 1-1, one head is provided for each surface of each of storage disks 22a–d such that data can be read from or written to the data tracks of all of the storage disks. The heads are coupled to pre-amplifier 31. It should be understood that disk drive 20 is merely representative of a disk drive system utilizing the present invention and that the present invention can be implemented in a disk drive system including more or less storage disks.

Storage disks 22a–d are mounted for rotation by spindle motor arrangement 29, as is known in the art. Moreover, read/write heads 24a–h are supported respective actuator arms 28a–h for controlled positioning over preselected radii of storage disks 22a–d to enable the reading and writing of data from and to the data tracks. To that end, actuator arms 28a–h are rotatably mounted on pin 30 by voice coil motor 32 operable to controllably rotate actuator arms 28a–h radially across the disk surfaces.

Each of read/write heads 24a–h is mounted to a respective one of actuator arm 28a–h by a flexure element (not shown) and comprises of magnetic transducer 25 mounted to slider 26 having an air bearing surface (not shown), all in a known manner. As typically utilized in disk drive systems, sliders 26 cause magnetic transducers 25 of the read/write heads 24a–h to "fly" above the surfaces of the respective storage disks 22a–d for non-contact operation of the disk drive system, as discussed above. When not in use, voice coil motor 32 rotates actuator arms 28a–h during a contact stop operation, to position read/write heads 24a–h over a respective landing zone, such as landing zone 58, where read/write heads 24a–h come to rest on the storage disk surfaces. As should be understood, each of read/write heads 24a–h is at rest on a respective one of landing zones 58 or 60 at the commencement of a contact start operation.

Printed circuit board (PCB) 34 is provided to mount control electronics for controlled operation of spindle motor 29 and voice coil motor 32. PCB 34 also includes read/write channel circuitry coupled to read/write heads 24a–h via pre-amplifier 31, to control the transfer of data to and from the data tracks of storage disks 22a–d. The manner for coupling PCB 34 to the various components of the disk drive is well known in the art, and includes connector 33 to couple the read/write channel circuitry to pre-amplifier 31.

Figure 12:
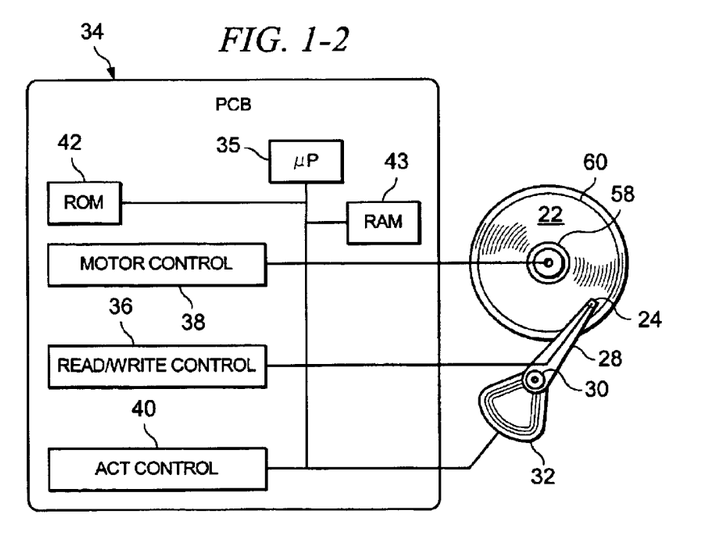

Referring now to FIG. 1-2, there is illustrated in schematic form PCB 34 and the electrical couplings between the control electronics on PCB 34 and the components of the disk drive system described above. Microprocessor 35 is coupled to each of read/write control 36, spindle motor control 38, actuator control 40, ROM 42 and RAM 43. In modern disk drive designs, the microprocessor can comprise a digital signal processor (DSP). Microprocessor 35 sends data to and receives data from storage disks 22a–d via read/write control 36 and read/write heads 24a–h.

Microprocessor 35 also operates according to instructions stored in ROM 42 to generate and transmit control signals to each of spindle motor control 38 and actuator control 40. Spindle motor control 38 is responsive to the control signals received from microprocessor 35 to generate and transmit a drive voltage to spindle motor 29 to cause storage disks 22a–d to rotate at an appropriate rotational velocity.

Similarly, actuator control 40 is responsive to the control signals received from microprocessor 35 to generate and transmit a voltage to voice coil motor 32 to controllably rotate read/write heads 24a–h, via actuator arms 28a–h, to preselected radial positions over storage disks 22a–d. The magnitude and polarity of the voltage generated by actuator control 40, as a function of the microprocessor control signals, determines the radial direction and radial speed of read/write heads 24a–h.

When data to be written or read from one of storage disks 22a–d are stored on a data track different from the current radial position of read/write heads 24a–h, microprocessor 35 determines the current radial position of read/write heads 24a–h and the radial position of the data track where read/write heads 24a–h are to be relocated. Microprocessor 35 then implements a seek operation wherein the control signals generated by microprocessor 35 for actuator control 40 cause voice coil motor 32 to move read/write heads 24a–h from the current data track to a destination data track at the desired radial position.

When the actuator has moved read/write heads 24a–h to the destination data track, a multiplexer (not shown) is used to couple read/write heads 24a–h over the specific data track to be written or read, to read/write control 36, as is generally known in the art. Read/write control 36 includes a read channel that, in accordance with modern disk drive design, comprises an electronic circuit that detects information represented by magnetic transitions recorded on the disk surface within the radial extent of the selected data track. As described above, each data track is divided into a number of data sectors.

During a read operation, electrical signals transduced by the head from the magnetic transitions of the data sectors are input to the read channel of read/write control 36 for processing via pre-amplifier 31. Random access memory (RAM) 43 can be used to buffer data read from or to be written to the data sectors of storage disks 22a–d via read/write control 36. The buffered data can be transferred to or from a host computer utilizing the disk drive for data storage.

Figure 2:
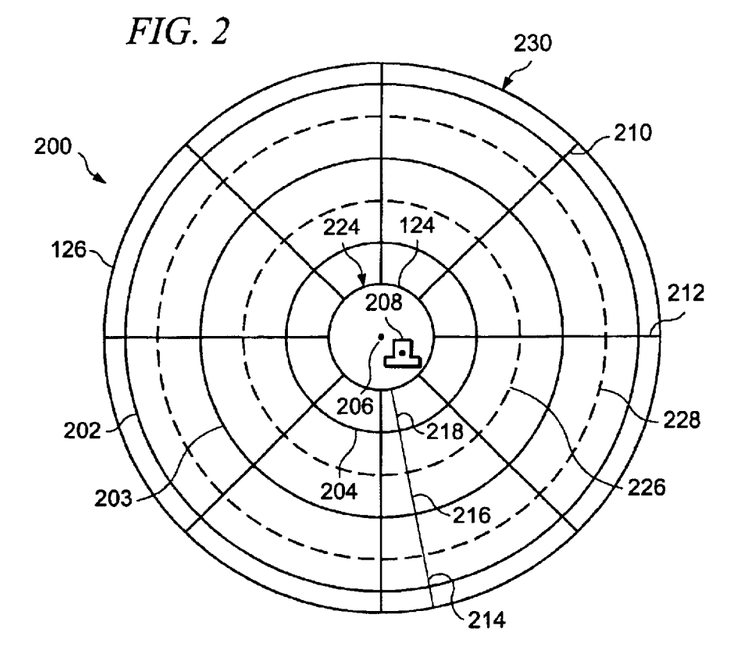
FIG. 2 is a top view of a section of a disc with pre-written servo tracks.

Referring now to FIG. 2, a top view of a section 200 of a disc, with pre-written servo-tracks such as 202, 203 and 204, which is mounted on a disc drive spindle motor having a spin-axis 208 is shown. Disc 200 includes a plurality of radially extending servo fields such as servo fields 210 and 212 which define a plurality of servo sectors. Disc 200 may also be divided into zones, with each zone including multiple tracks. In FIG. 2, three zones 214, 216 and 218 are shown. The three zones 214, 216 and 218 each have boundary tracks 224, 226, 228 and 230, respectively, for delineating the zones of the disc. Pre-written servo tracks 202, 203 and 204 have an actual track write center of rotation shown by reference numeral 206. If the track write center of rotation of the disc coincides with the center of the spindle motor and if the tracks are perfectly circular, there will be no repeated position errors or RRO errors occurring each time the head passes a particular circumferential location on the disc. However, since the tracks are never perfectly circular, WI-RRO always occurs in disc drives.

Further, as can be seen in FIG. 2, in a disc drive with a pre-written disc, such as disc 200, an incongruity between the track write center of rotation 206 and the spindle motor spin-axis 208 typically exists. Additionally, in such drives with pre-written discs, servo-track distortion occurs when the disc is clamped onto the spindle motor. The centering misalignment of the pre-written servo tracks, such as 202, 203 and 204, as well as servo track distortion due to disc clamping forces, contributes significantly to the RRO phenomenon. The RRO caused by centering misalignment and clamping forces has been found to be radially-dependent and thus varies coherently across the surface of the disc from the outer diameter (OD) to the inner diameter (ID) of the disc.

Under the present invention, an RD-RRO tracking scheme is employed to track RD-RRO in a disc drive. Here, the tracking of RD-RRO is carried out by determining RD-RRO control components for the servo tracks and storing data representing these RD-RRO control components. This stored data is utilized to follow the servo tracks.

Figure 31:
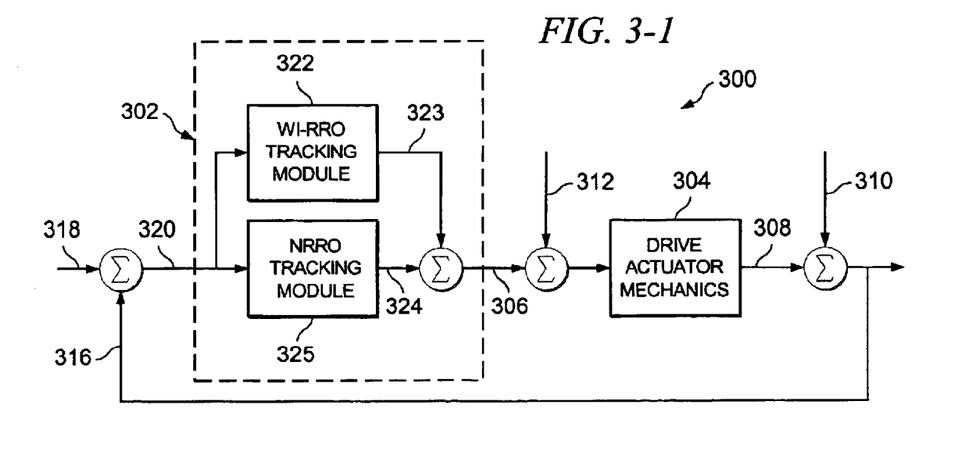

Referring now to FIG. 3-1, a block diagram of a servo loop 300 is shown. The servo loop 300 includes a servo controller 302 and disc drive actuator mechanics 304. Servo controller 302 is the servo controller system within actuator control 40 of FIG. 1-2. Drive actuator mechanics 304 may include voice coil motor 32, actuator arm 28, sliders 26, a suspension mechanism for suspending sliders 26, and the like.

Servo controller 302 generates a control current 306 that drives the voice coil motor 32 of drive actuator mechanics 304. In response, the drive actuator 304 produces head motion 308. In FIG. 3-1, the RRO error is represented as a separate input signal 310 even though the RRO would otherwise appear implicitly in head motion 308. The separation of RRO from head motion 308 provides a better understanding of the present invention. In addition, noise in the servo system has been separated and appears as noise 312, which is added to the control signal.

The sum of head motion 308, which includes noise 312, and RRO 310 results in the head's servo measurement signal, represented by reference numeral 316. Servo measurement signal 316 is subtracted from a reference signal 318, which is generated by actuator control 40 based on a desired location of the head. Subtracting head measurement 316 from reference signal 318 produces a position error signal (PES), represented by reference numeral 320, which is input to servo controller 302.

PES 320 includes an RRO error component and a non-repeatable run-out (NRRO) error component. As mentioned above, in drives including in-situ written discs, WI-RRO is caused by imperfectly written servo-tracks. In drives including discs with pre-written servo tracks, additional RD-RRO occurs due to misalignment of the track center of the disc and the spindle-axis, and due to servo track distortion caused by disc clamping forces. NRRO is caused by spindle ball bearing defects, rocking modes, disc vibration, and the like.

As can be seen in FIG. 3-1, servo controller 302 includes a WI-RRO tracking module 322 and an NRRO tracking module 324. WI-RRO tracking module 322 extracts the RRO component(s) from the PES and outputs an RRO control signal 323. Similarly, NRRO tracking module 325 extracts the NRRO component(s) from the PES and outputs an NRRO control signal 324. Control signals 323 and 324 are added to provide control signal 306.

Figure 32:
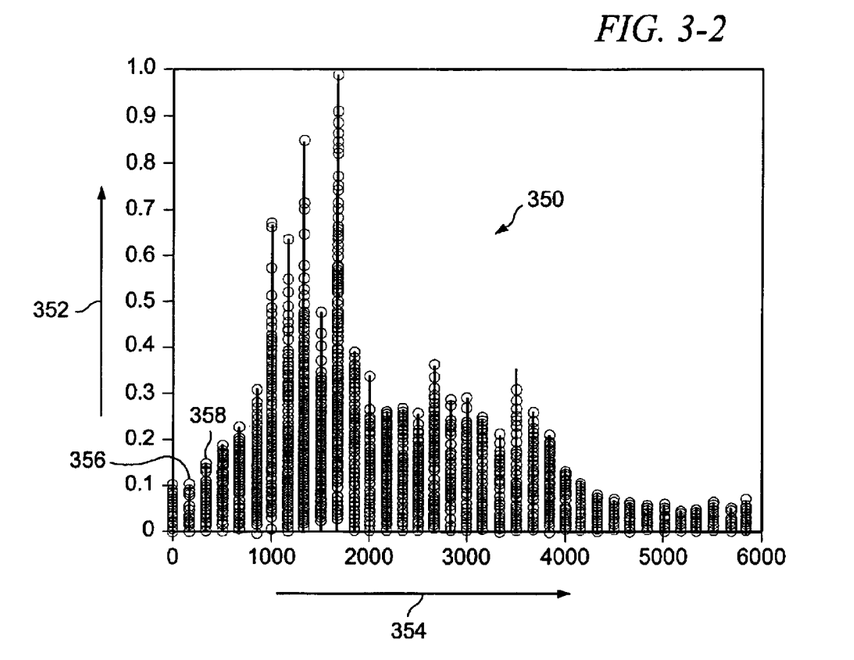
Figure 33:
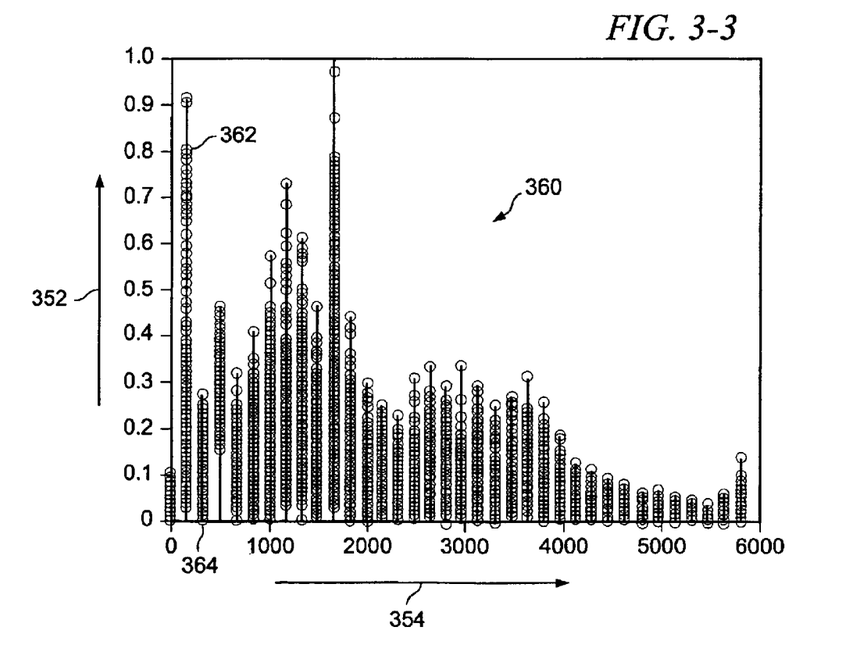
Figure 51:
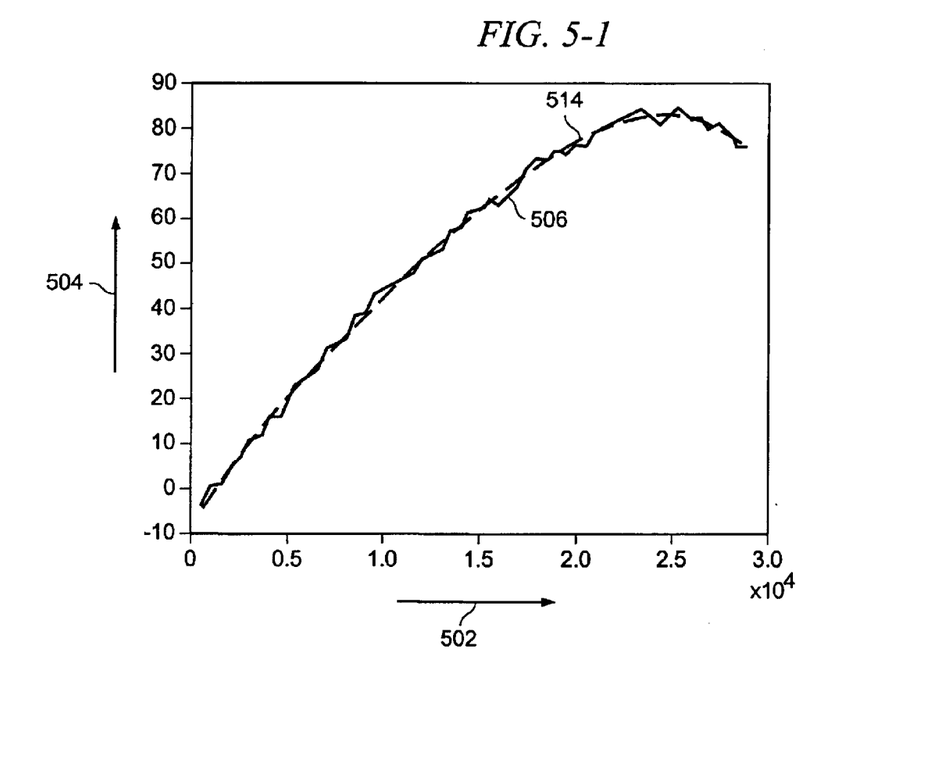
Figure 52:
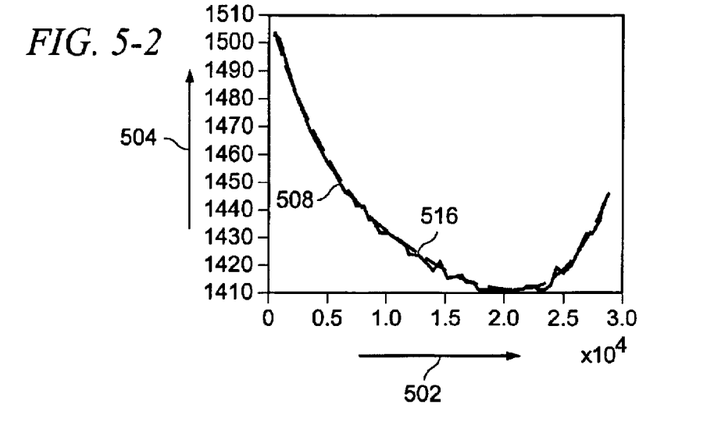
Figure 53:
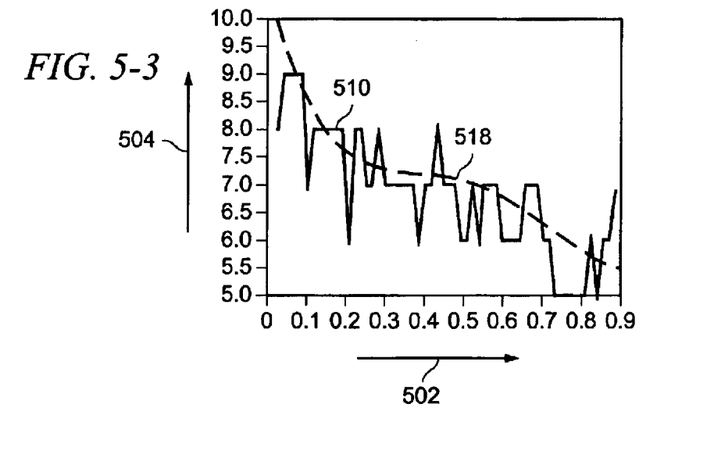
Figure 54:
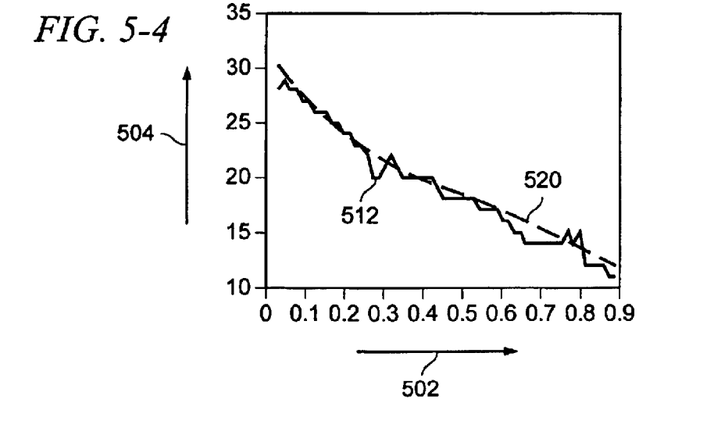

WI-RRO tracking module 322 is designed for use with drives that include discs with in-situ-written servo-tracks and does not function efficiently when employed in drives with discs that have pre-written servo tracks. An example feed-forward algorithm is employed in WI-RRO tracking module 322, and results obtained from seek/settle operations by employing such a WI-RRO tracking scheme in drives with in-situ-written discs and drives with pre-written discs are described below in connection with equations 1 through 3 and FIGS. 3-2 and 3-3.

RRO components from rotation of the spindle motor dominate at the first few harmonics of the spindle frequency. One feed-forward algorithm that produces an RRO control signal, $i_f$, used to track the $f^{th}$ spindle harmonic is generated as:

$$i_f = a_f(n)\sin(f \cdot \theta_k) + b_f(n)\cos(f \cdot \theta_k) \quad (1)$$

where n is the index of the spindle rotation (occurs at once per revolution) and k is the index for the current servo sector, $a_f$ is the sine weight and $b_f$ is the cosine weight, and the term $(f \cdot \theta_k)$ is equal to the rotational frequency of the disk in radians per sample of PES. Coefficients $a_f(n)$ and $b_f(n)$ represent the WI-RRO compensation weights and are updated once per spindle rotation as:

$$a_f(n) = a_f(n-1) + g_f \sum_{k=0}^{N-1} \sin(f \cdot \theta_k) PES(k) \quad (2)$$

and $$b_f(n) = b_f(n-1) + g_f \sum_{k=0}^{N-1} \cos(f \cdot \theta_k) PES(k) \quad (3)$$

where N is the number of sectors, $g_f$ is the feedforward gain, and PES is the position error signal.

The algorithm described above, which implements equations 1, 2 and 3, does not perform adequately in drives with large RD-RRO. This is illustrated by the plots shown in FIGS. 3-2 and 3-3. FIG. 3-2 shows RRO spectrum 350, with horizontal axis 354 indicating frequency in Hertz and vertical axis 352 indicating magnitude in microinches, collected on an in-situ-written drive. FIG. 3-3 shows RRO spectrum 360 for a drive with pre-written discs (with large radially-dependent RRO).

Both plots represent spectrums resulting from 200 random seeks. After each seek, the PES signal was collected over eight revolutions and the RRO was subsequently computed. In each drive, the algorithm described above was employed. The first harmonic component, 1f, represented by reference numeral 356 (FIG. 3-2) and second harmonic component, 2f, represented by reference numeral 358 (FIG. 3-2), which represent a substantial portion of the RD-RRO, are relatively small in the case of the drive with in-situ-written discs. However, the 1f and 2f harmonic components 362 and 364 (FIG. 3-3) are relatively large in the drive with prewritten discs, thereby demonstrating that the algorithm is unsuitable for such drives.

Figure 4:
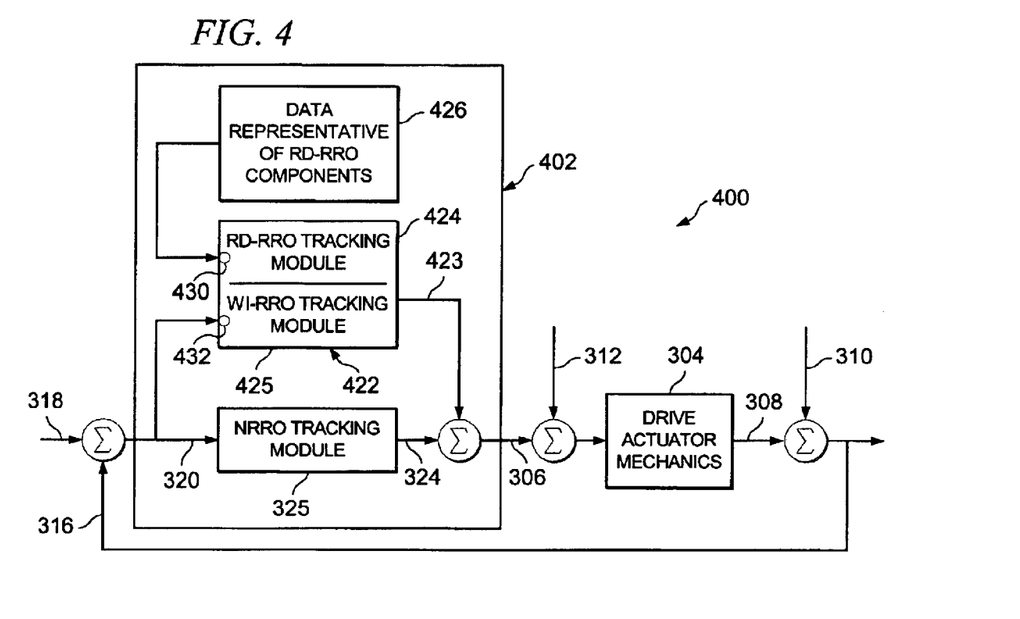
FIG. 4 is a block diagram of a servo loop of an embodiment of the present invention.

To obtain adequate performance in drives with large RD-RRO, the present invention includes an RRO tracking module that is capable of utilizing stored data representative of radially-dependent RRO to produce a suitable RRO control signal when the drive switches from track seek mode to track following mode. Referring now to FIG. 4-1, a block diagram of a servo loop of the present invention is shown. In FIG. 4-1, the elements common to FIG. 3-1 are numbered the same. Controller 402, of servo loop 400, is designed to track the relatively large RD-RRO in drives with pre-written discs.

As can be seen in FIG. 4-1, controller 402 includes RRO tracking module 422 and NRRO tracking module 324. RRO tracking module 422 includes a first input 432 for receiving PES 320 and a second input 430 capable of receiving data representative of RD-RRO components, represented by reference numeral 426. RRO tracking module 422 includes RD-RRO tracking module 424 and WI-RRO tracking module 425. Modules 424 and 425 may be integrated or separate. Data 426 is obtained either during factory calibration or start-up calibration of the drive. An example calibration procedure for obtaining data 426 is described further below. Data 426 may be stored in the form of a table in memory (for example, non-volatile memory) contained in actuator control 40 (FIG. 1).

Depending upon the particular track to be followed, RRO tracking module 422 selects a suitable data value from tracking data 426 and responsively produces an RRO control signal 423 of appropriate magnitude and phase for injection into the servo loop. Control signal 423 includes a RD-RRO signal component and a WI-RRO signal component. In one embodiment of the present invention, a suitable RD-RRO data value is selected at the beginning of a seek operation for a destination track so that the radially-dependent RRO can be tracked as soon as the head arrives at the destination track, thereby substantially reducing the settle time.

With the present invention, the RD-RRO components, i.e. RD-RRO zoned compensation weights, are determined and stored for a subset of the tracks on the disc (less than all of the tracks on the disc). This subset of tracks on the disc, in a preferred embodiment, includes tracks positioned at the boundaries of the zones on the disc. Each of these zone boundary tracks of the subset of tracks for which RD-RRO components are determined are preferably spaced evenly apart between the ID and OD of the disc. The data for these boundary tracks may be stored in a table in element 426 and may be used to determine an appropriate RD-RRO signal component of the control signal 423. In a preferred embodiment, the data for the boundary tracks of a zone can be utilized by the present invention for interpolating RD-RRO tracking of other tracks within the zone (or extrapolate to tracks outside the zone) since the RD-RRO varies coherently across the surface of the disc from the outer diameter (OD) to the inner diameter (ID).

For example, referring to FIG. 2, RD-RRO zoned compensation weights can be obtained for boundary tracks 224 and 226 of zone 218, for boundary tracks 226 and 228 of zone 216, and for boundary tracks 228 and 230 in zone 214. The RD-RRO zoned compensation weight data for each of these boundary tracks is used to populate a table of data values used by the present invention to interpolate the RD-RRO zoned compensation weight data values for other tracks within the defined zones. While boundary tracks 226 and 228 appear as boundary tracks for two different zones, the table that stores the RD-RRO compensation weight data for these boundary tracks will only contain one set of weights for each of these tracks.

In a preferred embodiment of the present invention, in order to establish a table of RD-RRO zoned compensation weight data for boundary tracks, the following calibration procedure is performed. First, summing of RD-RRO zoned compensation weights with WI-RRO compensation weights, i.e. the RRO compensation weights determined from actual measurements of RRO at the current track during normal operation, is disabled. The read/write head is made to seek to the first track of the first zone specified in the calibration's track/zone table. The track follow system and WI-RRO compensation system are allowed time to stabilize. Once stabilized, the WI-RRO compensation weights of each harmonic being calibrated for the current track/zone are recorded. The read/write head is then made to seek to the next track/zone specified in the calibration's track/zone table and the process is repeated until all zones have been calibrated. The above process is then repeated for each of the head/disc surface pairs that exist in the disc drive. The WI-RRO compensation weights recorded in this manner are thus stored in a table of RD-RRO zoned compensation weights for boundary tracks of zones of the disc. As such, they are referred to as the RD-RRO zoned compensation weights during subsequent operations of the disc drive, rather than the WI-RRO compensation weights which will later be determined as the WI-RRO tracking module learns the WI-RRO as part of normal operation of the disc drive.

Once the table of RD-RRO zoned compensation weights has been populated using the above process, the WI-RRO compensation weights are cleared and allowed to learn the WI-RRO. The control of the read/write head by summing of the RD-RRO zoned compensation weights with the WI-RRO compensation weights is then re-enabled.

Having established a table of boundary track RD-RRO zoned compensation weight data values, the present invention uses these values to interpolate RD-RRO zoned compensation weight data values for a destination track. For example, when the disc drive is to seek to an identified destination track, the zone in which the destination track resides is identified and the corresponding RD-RRO zoned compensation weight data values for the boundary tracks of the identified zone are read from the table of RD-RRO zoned compensation weight data values. The zone in which the destination track resides may be determined, for example, by comparing a track number of the destination track to the track numbers for boundary tracks. The two boundary tracks that have track numbers that are closest to the destination track's number, one being lower and one being higher than the destination track's number, may be determined to be the boundary tracks for the zone in which the destination track is present.

A piecewise linear interpolation using these RD-RRO zoned compensation weight data values is performed in order to calculate RD-RRO zoned compensation weight data values required at the destination track. An exemplary implementation of the piecewise linear interpolation, in accordance with the present invention, involves calculating a fraction of a zone (in number of tracks) by dividing the distance (in tracks) from the target track to the zone boundary track that is prior to the target track by the zone size (in tracks). Then, the difference in the RD_RRO weights is found from the zone boundaries adjacent to the target track. The difference of the RD_RRO weights is multiplied by the fraction of zone to find the fraction of weights to the target track. Finally the fraction of the RD_RRO weights is added to the RD_RRO weight from the zone boundary prior to the target track.

Sometimes, a destination track may be outside the zones for which compensation weight data is recorded in the zone boundary track table. If the destination track is beyond the last track/zone boundary for which an RD-RRO zoned compensation weight data value is present in the table, then the RD-RRO zoned compensation weight data values for the boundary tracks of the last two zones in the table are used to perform a piecewise linear extrapolation to the destination track.

The interpolated, or extrapolated, RD-RRO zoned compensation weight data values are then summed with WI-RRO compensation weight values to generate a control signal for controlling the operation of the read/write head of the disc drive. In one particular embodiment of the present invention, large radially-dependent RRO can be tracked by the feed forward algorithm described in equation 4 below. Here, RRO control signal, $i_{ft}$, used to track the $f^{th}$ spindle harmonic is generated as:

$$i_{fl} = (A_f(\text{track\_id}) + a_f(n))\sin(f\cdot\theta_k) + (B_f(\text{track\_id}) + b_f(n))\cos(f\cdot\theta_k) \quad (4)$$

For this algorithm, terms $a_f(n)$ and $b_f(n)$ are WI-RRO compensation weight components which are updated in the same manner described in equations 2 and 3 above. $A_f(\text{track\_id})$ and $B_f(\text{track\_id})$ represent RD-RRO zoned compensation weight components or terms which can be determined using piecewise linear interpolation of the RD-RRO zoned compensation weight values stored for boundary tracks of the zone in which the destination track is situated (or the last two zones in cases where extrapolation is necessary).

The algorithm described by equations 1 through 3 may be used to determine $a_f(n)$ and $b_f(n)$ during a calibration procedure. Steady-state values for $a_f(n)$ and $b_f(n)$ may be read from equally spaced tracks from the outer diameter (OD) to the inner diameter (ID) of the disc. FIGS. 5-1 through 5-4 illustrate plots for $a_f(n)$ and $b_f(n)$ for the first and second spindle harmonics, 1f and 2f. In FIGS. 5-1 through 5-4, horizontal axis 502 represents track identification number and vertical axis 504 represents scaled current. Plot 506 (FIG. 5-1) represents $a_1(n)$ ($a_f(n)$ for the first harmonic) and plot 508 (FIG. 5-2) represents $b_1(n)$ ($b_f(n)$ for the first harmonic). Similarly, plot 510 (FIG. 5-3) represents $a_2(n)$ ($a_f(n)$ for the second harmonic) and plot 512 (FIG. 5-4) represents $b_2(n)$ ($b_f(n)$ for the second harmonic).

Figure 6:
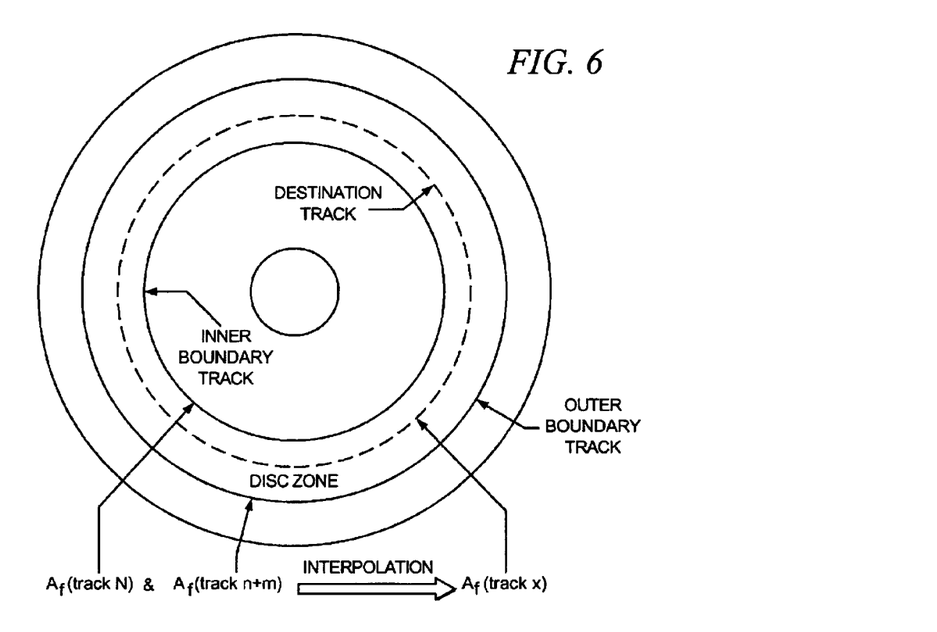
FIG. 6 is an exemplary diagram of a disc zone that illustrates interpolation of RD-RRO compensation weights using the mechanisms of the present invention.

The values for $A_f(\text{track\_id})$ and $B_f(\text{track\_id})$ may be obtained, as previously described, through a piecewise linear interpolation of the RD-RRO zoned compensation weight data values stored for boundary tracks of zones of the disc. As illustrated in FIG. 6, the boundary tracks for a disc zone (shown as a shaded ring) are an inner boundary track, track n, and an outer boundary track, track n+m, wherein n is a starting track number and m is the number of tracks in the disc zone. The destination track lies between the inner boundary track and the outer boundary track and is denoted the destination track, track x.

The RD-RRO zoned compensation weight data for the inner boundary track and the outer boundary track are known data values stored in the table of RD-RRO zoned compensation weights. These data values may be obtained in the manner previously described above. Knowing the RD-RRO zoned compensation weights for these boundary tracks, the RD-RRO compensation weight for track x may be estimated using piecewise linear interpolation based on the known RD-RRO zoned compensation weights for the boundary tracks.

Thus, having determined the WI-RRO compensation weights $a_f(n)$ and $b_f(n)$ through the calibration discussed above and estimating the RD-RRO compensation weights from stored RD-RRO compensation weights for boundary tracks of zones of the disc, equation 4 above may be solved to determine the proper feed-forward control signal for controlling the operation of the read/write head of the disc drive. The control signal obtained using equation 4 is summed with the control signal from the NRRO tracking module 324 to generate a resulting control signal which is summed with a noise compensation signal to generate the input to the drive actuator mechanics 304. In this way, the actuator of the read/write head is controlled such that RD-RRO is compensated for.

Thus, the present invention provides a mechanism in which a relatively small table of RD-RRO zoned compensation weights may be utilized to estimate the RD-RRO compensation weights at every track of the disc. The present invention may use a computationally simple piecewise linear interpolation of known RD-RRO zoned compensation weights for a zone in which the destination track is present, to estimate the RD-RRO compensation weight for the destination track.

Figure 7:
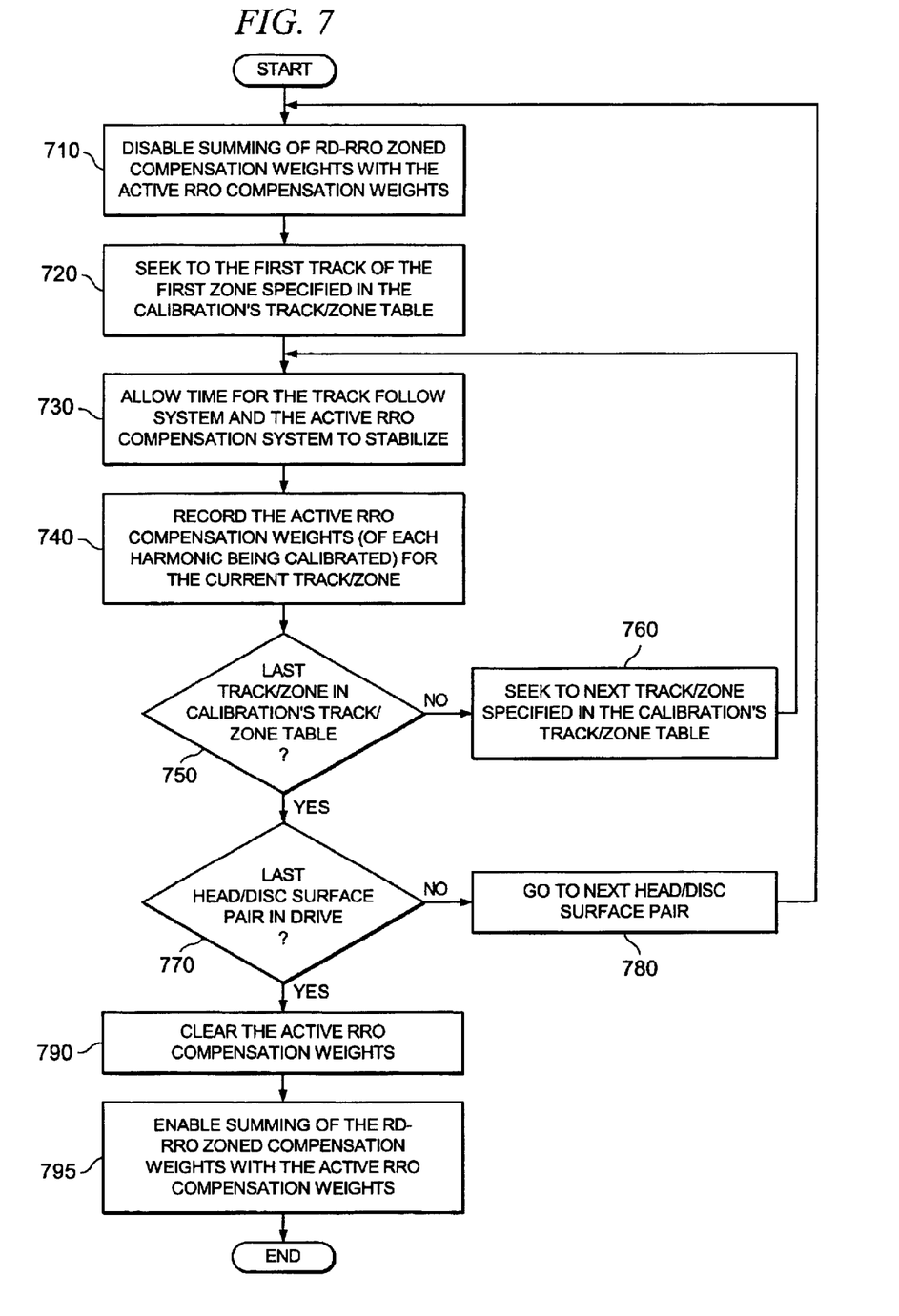
FIG. 7 is a flowchart outlining an exemplary operation of the present invention for generating the table of RD-RRO compensation weights for boundary tracks of zones of a disc.
Figure 8:
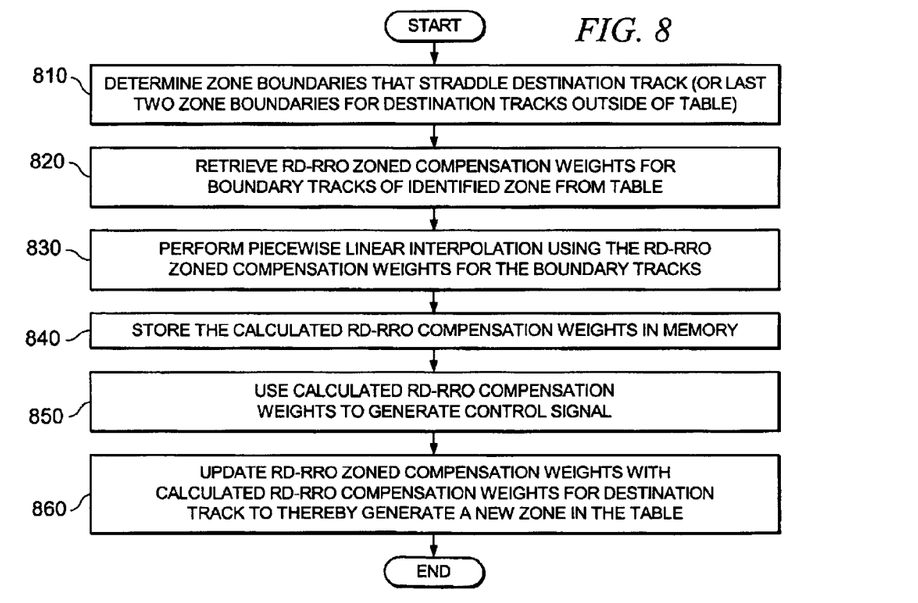
FIG. 8 is a flowchart outlining an exemplary operation of the present invention for determining the RD-RRO compensation weights for a destination track based on RD-RRO compensation weights from the table generated using the operation of FIG. 7.

FIGS. 7 and 8 are flowcharts outlining exemplary operations of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 7 is a flowchart outlining an exemplary operation of the present invention for generating the table of RD-RRO compensation weights for boundary tracks of zones of a disc. As shown in FIG. 7, the operation starts by disabling summing of RD-RRO zoned compensation weights with the WI-RRO compensation weights (referred to in FIG. 7 as the "active" RRO compensation weights) (step 710). A seek to the first track of the first zone specified in the calibration's track/zone table is performed (step 720) and time is allowed for the track following system and the WI-RRO compensation system to stabilize (step 730). The WI-RRO compensation weights of each harmonic being calibrated for the current track/zone are then recorded (step 740).

A determination is made as to whether this was the last track/zone in the calibration's track/zone table (step 750). If not, then a seek to the next track/zone specified in the calibration's track/zone table is performed (step 760) and the operation returns to step 730. If this is the last track/zone in the calibration's track/zone table, then a determination is made as to whether this is the last head/disc surface pair in the drive (step 770). If not, the operation goes to the next head/disc surface pair (step 780) and returns to step 710.

If this is the last head/disc surface pair in the drive, then the WI-RRO compensation weights are cleared (step 790). The summing of the RRO zoned compensation weights with the WI-RRO compensation weights is re-enabled (step 795) and the operation terminates.

FIG. 8 is a flowchart outlining an exemplary operation of the present invention for determining the RD-RRO compensation weights for a destination track based on RD-RRO compensation weights from the table generated using the operation of FIG. 7. The operation in FIG. 8 assumes that the destination track does not already have an entry in the table of RD-RRO zoned compensation weights and thus, the compensation weights must be interpolated or extrapolated from known weights. However, if the destination track has an entry in the table, then the entry may merely be retrieved and utilized without having to perform interpolation/extrapolation in the manner described in FIG. 8.

As shown in FIG. 8, the operation starts by determining the zone boundaries that straddle the destination track, or the last two zone boundaries for destination tracks outside of the table (step 810). The RD-RRO zoned compensation weights for the boundary tracks of the identified zone are retrieved from the table (step 820). A piecewise linear interpolation using the RD-RRO zoned compensation weights for the boundary tracks is performed (step 830). The calculated RD-RRO compensation weights are stored in memory (step 840) and may be used to generate a control signal (step 850). In addition, the stored RD-RRO compensation weights may be used to update the RD-RRO zoned compensation weights table such that a new zone is effectively created (step 860). The operation then ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
   identifying zone boundaries for a zone that includes a destination position;
   retrieving compensation values for the zone boundaries from a data structure;
   approximating a runout compensation value for the destination position based on the retrieved compensation values for the zone boundaries; and
   generating a control signal for controlling an arm based on the approximate compensation value for the destination position.

2. The method of claim 1, wherein approximating the runout compensation value for the destination position includes performing a piecewise linear interpolation on the retrieved compensation values for the zone boundaries.

3. The method of claim 1, wherein the data structure is a table of radially-dependent repeatable run-out zoned compensation values for boundaries of established zones of a storage medium.

4. The method of claim 3, wherein the table is generated by recording, during a calibration process, write-in repeatable run-out compensation values for boundaries of each zone of the storage medium for at least one harmonic.

5. The method of claim 3, wherein identifying zone boundaries for the zone that includes a destination position includes comparing a track number to track numbers for boundaries in the table and selecting a first boundary track whose number is closest to, and larger than, the track number for the destination position, and selecting a second boundary track whose number is closest to, and less than, the track number for the destination position.

6. The method of claim 3, wherein, if the destination position is beyond the last established zone for which compensation values are present in the table, then boundaries for the last two zones in the table are used to approximate the runout compensation value for the destination position.

7. The method of claim 1, wherein approximating the runout compensation value for the destination position includes:
   calculating a fraction of zone by dividing a distance from the destination position to a zone boundary that is prior to the destination position, by a zone size;
   calculating a difference in the compensation values for the zone boundaries;
   multiplying the difference in the compensation values for the zone boundaries by the fraction of zone to generate a fraction of compensation values; and
   adding the fraction of compensation values to the runout compensation value for the zone boundary that is prior to the destination position.

8. The method of claim 1, wherein generating a control signal for controlling an arm based on the approximate runout compensation value for the destination position includes:
   summing the approximate runout compensation value for the destination position with a write-in repeatable run-out compensation value.

9. The method of claim 1, wherein generating a control signal for controlling the arm based on the approximate compensation value for the destination position includes generating the control signal based on the following equation:

$$i_{fl} = (A_f(\text{track\_id}) + a_f(n))\sin(f \cdot \theta_k) + (B_f(\text{track\_id}) + b_f(n))\cos(f \cdot \theta_k)$$

where $a_f(n)$ and $b_f(n)$ are write-in repeatable run-out compensation value components, $A_f(\text{track\_id})$ and $B_f(\text{track\_id})$ represent compensation value components for a destination track track\_id, f is a spindle harmonic, n is a number of sectors, and $f \cdot \theta_k$ is a rotational frequency of the disc.

10. The method of claim 9, wherein $a_f(n)$ and $b_f(n)$ are determined the following equations:

$$a_f(n) = a_f(n-1) + g_f \sum_{k=0}^{N-1} \sin(f \cdot \theta_k) PES(k)$$

and $$b_f(n) = b_f(n-1) + g_f \sum_{k=0}^{N-1} \cos(f \cdot \theta_k) PES(k)$$

where $g_f$ is a feedforward gain and PES is a position error signal.

11. An apparatus comprising:
a repeatable run-out tracking module;
a data structure storage device coupled to the repeatable run-out tracking module; and
a control signal generator coupled to the repeatable run-out tracking module, wherein the repeatable run-out tracking module identifies zone boundaries for a zone that includes a destination position, retrieves compensation values for the zone boundaries from a data structure in the data structure storage device, and approximates a compensation value for destination position based on the retrieved compensation values for the zone boundaries, and wherein the control signal generator generates a control signal for controlling an arm based on the approximate compensation value for the destination position.

12. The apparatus of claim 11, wherein the repeatable run-out tracking module approximates a compensation value for the destination track by performing a piecewise linear interpolation on the retrieved compensation values for the zone boundaries.

13. The apparatus of claim 11, wherein the data structure is a table of radially-dependent repeatable run-out zoned compensation values for boundaries of established zones of a storage medium.

14. The apparatus of claim 13, wherein the table is generated by recording, during a calibration process, write-in repeatable run-out compensation values for boundaries of each zone of the storage medium for at least one harmonic.

15. The apparatus of claim 13, wherein, if the destination position is beyond the last established zone for which compensation values are present in the table, then boundaries for the last two zones in the table are used to approximate the compensation value for the destination position.

16. The apparatus of claim 11, wherein the repeatable run-out tracking module identifies zone boundaries far a zone in which a destination position is positioned by comparing a track number to track numbers for boundaries in the data structure and selecting a first boundary track whose number is closest to, and larger than, the track number for the destination position, and selecting a second boundary track whose number is closest to, and less than, the track number for the destination position.

17. The apparatus of claim 11, wherein the repeatable run-out tracking module approximates a compensation value for the destination position by:
calculating a fraction of zone by dividing a distance from the destination position to a zone boundary track that is prior to the destination position, by a zone size;
calculating a difference in the compensation values for the zone boundaries;
multiplying the difference in the compensation values for the zone boundaries by the fraction of zone to generate a fraction of compensation values; and
adding the fraction of compensation values to a compensation value for the zone boundary that is prior to the destination position.

18. The apparatus of claim 11, wherein the control signal generator generates a control signal for controlling an operation of the arm based on the approximate compensation value for the destination position by:
summing the approximate compensation value for the destination position with a write-in repeatable run-out compensation value.

19. The apparatus of claim 11, wherein the control signal generator generates a control signal for controlling an operation of the arm based on the approximate compensation value for the destination position by generating the control signal based on the following equation:

$$i_{fl}=(A_f(\text{track\_id})+a_f(n))\sin(f\cdot\theta_k)+(B_f(\text{track\_id})+b_f(n))\cos(f\cdot\theta_k)$$

where $a_f(n)$ and $b_f(n)$ are write-in repeatable run-out compensation value components, $A_f(\text{track\_id})$ and $B_f(\text{track\_id})$ represent compensation value components for a destination track track_id, f is a spindle harmonic, n is a number of sectors, and $f\cdot\theta_k$ is a rotational frequency of the disc.

20. The apparatus of claim 19, wherein $a_f(n)$ and $b_f(n)$ are determined from the following equations:

$$a_f(n) = a_f(n-1) + g_f \sum_{k=0}^{N-1} \sin(f\cdot\theta_k)PES(k)$$

and $$b_f(n) = b_f(n-1) + g_f \sum_{k=0}^{N-1} \cos(f\cdot\theta_k)PES(k)$$

where $g_f$ is a feedforward gain and PES is a position error signal.

21. A method comprising:
determining a compensation value for a destination position based on predetermined compensation values; and
generating a control signal based on the predetermined compensation values, wherein the control signal compensates for run-out.

22. The method of claim 21 wherein the run-out is repeatable.

23. The method of claim 22 wherein the run-out is radially-dependent.

24. The method of claim 21 wherein the determining step includes interpolating the compensation values.

25. The method of claim 21 wherein the determining step includes extrapolating the compensation values.

26. The method of claim 21 wherein the predetermined compensation values are associated with zone boundaries.

* * * * *